US011282110B1

(12) United States Patent
Walker et al.

(10) Patent No.: US 11,282,110 B1
(45) Date of Patent: Mar. 22, 2022

(54) SYSTEM FOR PROCESSING A DIGITAL PROMOTION THROUGH A MESSENGER BOT AND RELATED METHODS

(71) Applicant: INMAR CLEARING, INC., Winston-Salem, NC (US)

(72) Inventors: Jess D. Walker, Georgetown, TX (US); Jeffery Hayes, Seattle, WA (US); Ryan Halper, New York, NY (US)

(73) Assignee: INMAR CLEARING, INC., Winston-Salem, NC (US)

( * ) Notice: Subject to any disclaimer, the term of this patent is extended or adjusted under 35 U.S.C. 154(b) by 263 days.

(21) Appl. No.: 16/017,576

(22) Filed: Jun. 25, 2018

(51) Int. Cl.
G06Q 30/02 (2012.01)
H04L 12/58 (2006.01)
H04L 51/02 (2022.01)

(52) U.S. Cl.
CPC ..... *G06Q 30/0261* (2013.01); *G06Q 30/0259* (2013.01); *H04L 51/02* (2013.01); *G06Q 30/0277* (2013.01)

(58) Field of Classification Search
None
See application file for complete search history.

(56) References Cited

U.S. PATENT DOCUMENTS

| 7,239,871 | B2 | 7/2007 | Shamp et al. |
| 9,129,333 | B2 * | 9/2015 | Hardie ............... H04W 4/21 |
| 9,978,078 | B2 * | 5/2018 | Georgoff ............ G06Q 30/0246 |
| 10,757,043 | B2 * | 8/2020 | Gershony ............ H04L 51/20 |
| 2004/0186766 | A1 | 9/2004 | Fellenstein et al. |
| 2013/0191213 | A1 * | 7/2013 | Beck ............... G06Q 30/0207 705/14.53 |
| 2013/0204690 | A1 * | 8/2013 | Liebmann ............ G06Q 20/327 705/14.26 |

(Continued)

FOREIGN PATENT DOCUMENTS

WO WO-2018214163 A1 * 11/2018 ......... G06Q 30/0251

OTHER PUBLICATIONS

"Advertising in Popular Instant Messengers"; D. Lugovoy 2018 IEEE.*

(Continued)

*Primary Examiner* — Victoria E Frunzi
(74) *Attorney, Agent, or Firm* — Allen, Dyer, Doppelt + Gilchrist, P.A. Attorneys at Law

(57) ABSTRACT

A system for processing a digital promotion may include a cloud server. The cloud server may be configured to operate a messenger bot associated with a digital advertisement for a given product on a mobile wireless communications device associated with a given user, collect information from the messenger bot, and determine whether a potential redemption location is within a given area associated with the mobile wireless communications device. When the potential redemption location is within the given area, the cloud server may communicate a first digital promotion for the given product through the messenger bot to the mobile wireless communications device based upon the collected information. When the potential redemption location is outside the given area, the cloud server may communicate a second digital promotion through the messenger bot to the mobile wireless communications device based upon the collected information.

28 Claims, 4 Drawing Sheets

(56) References Cited

U.S. PATENT DOCUMENTS

| | | | |
|---|---|---|---|
| 2015/0172228 A1* | 6/2015 | Zalepa | H04L 12/1813 709/206 |
| 2019/0066156 A1* | 2/2019 | McMichael | G06Q 30/0224 |
| 2019/0259062 A1* | 8/2019 | Caldwell | G06Q 30/0261 |

OTHER PUBLICATIONS

Street Marketing: How Proximity and Context drive Coupon Redemption; Sarah Spiekermann, Matthias Rothensee, and Michael Klafft (Year: 2010).*
Walker et al., U.S. Appl. No. 16/155,037, filed Oct. 9, 2018.

* cited by examiner

SYSTEM FOR PROCESSING A DIGITAL PROMOTION THROUGH A MESSENGER BOT AND RELATED METHODS

TECHNICAL FIELD

The present invention relates to the field of electronics, and more particularly, to messenger bot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A system for processing a digital promotion may include a mobile wireless communications device associated with a given user, and a cloud server coupled to the mobile wireless communications device. The cloud server may be configured to operate a messenger bot associated with a digital advertisement for a given product on the mobile wireless communications device and collect information from the messenger bot. The cloud server may also be configured to determine whether a potential redemption location is within a given area associated with the mobile wireless communications device. When the potential redemption location is within the given area, the cloud server may be configured to communicate a first digital promotion for the given product through the messenger bot to the mobile wireless communications device based upon the collected information. When the potential redemption location is outside the given area, the cloud server may be configured to communicate a second digital promotion through the messenger bot to the mobile wireless communications device based upon the collected information.

The second digital promotion may be for the given product, for example. The second digital promotion may be for a competitor product to the given product. The first digital promotion may be redeemable only at the potential redemption location, for example.

The second digital promotion may be redeemable at the potential redemption location and at least one other redemption location. The first digital promotion may be for an entire purchase price of the given product and redeemable during a purchase transaction for the given product at the potential location. The second digital promotion may be for a post-purchase rebate, for example.

The cloud server may be configured to communicate, through the messenger bot, a plurality of selectable potential redemption locations determined to be within the given area. The cloud server may also be configured to collect a user-selected potential redemption location from the plurality of selectable potential redemption locations as the potential redemption location, for example.

The given product may include a given brand of products. The information collected from the messenger bot may include at least one of a user name, social-media profile, user date of birth, user geographic location, and desired product from a brand thereof, for example.

The mobile wireless communications device may include a geographic position determining device. The cloud server may be configured to determine whether the potential redemption location is within the given area. The cloud server may be configured to cooperate with the mobile wireless communications device to store the first digital promotion in a digital wallet associated with the given user, for example.

A method aspect is directed to a method of processing a digital promotion. The method may include using a cloud server coupled to a mobile wireless communications device associated with a given user to operate a messenger bot associated with a digital advertisement for a given product on the mobile wireless communications device and collect information from the messenger bot. The method may also include using the cloud server to determine whether a potential redemption location is within a given area associated with the mobile wireless communications device, and when the potential redemption location is within the given area, communicate a first digital promotion for the given product through the messenger bot to the mobile wireless communications device based upon the collected information. The method may further include using the cloud server to, when the potential redemption location is outside the given area, communicate a second digital promotion through the messenger bot to the mobile wireless communications device based upon the collected information.

A computer readable medium aspect is directed to a non-transitory computer readable medium for a cloud server of a system for processing a digital promotion. The non-transitory computer readable medium includes computer executable instructions that when executed by a processor of the cloud server cause the processor to perform operations. The operations may include operating a messenger bot associated with a digital advertisement for a given product on a mobile wireless communications device associated with a given user and collecting information from the messenger bot. The operations may also include determining whether a potential redemption location is within a given area associated with the mobile wireless communications device. The operations may also include, when the potential redemption location is within the given area, communicating a first digital promotion for the given product through the messenger bot to the mobile wireless communications device based upon the collected information, and when the potential redemption location is outside the given area, communicating a second digital promotion through the messenger bot to the mobile wireless communications device based upon the collected information.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
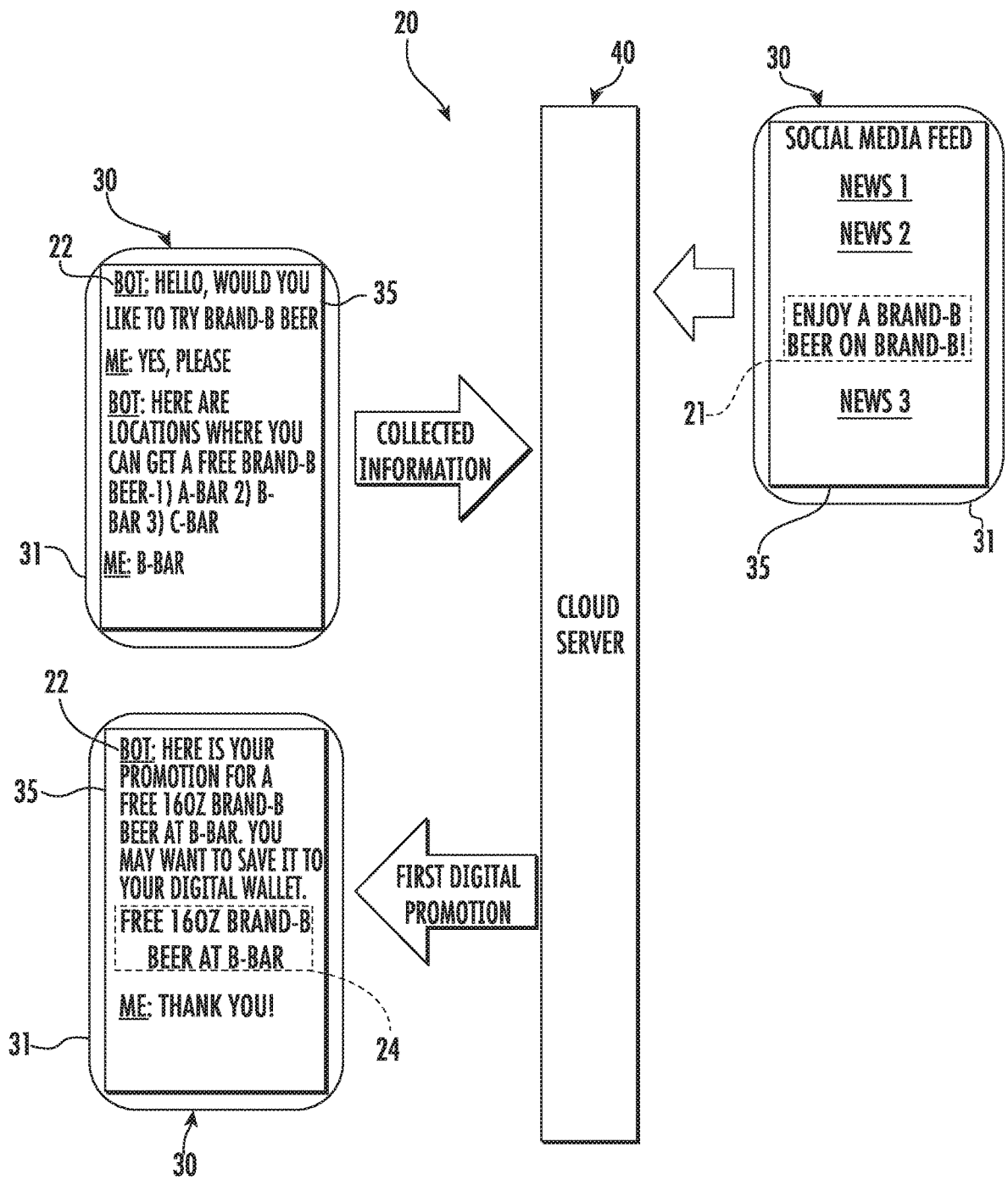
FIG. 1A is a schematic diagram of a system operating in a first mode according to an embodiment.
Figure 1B:
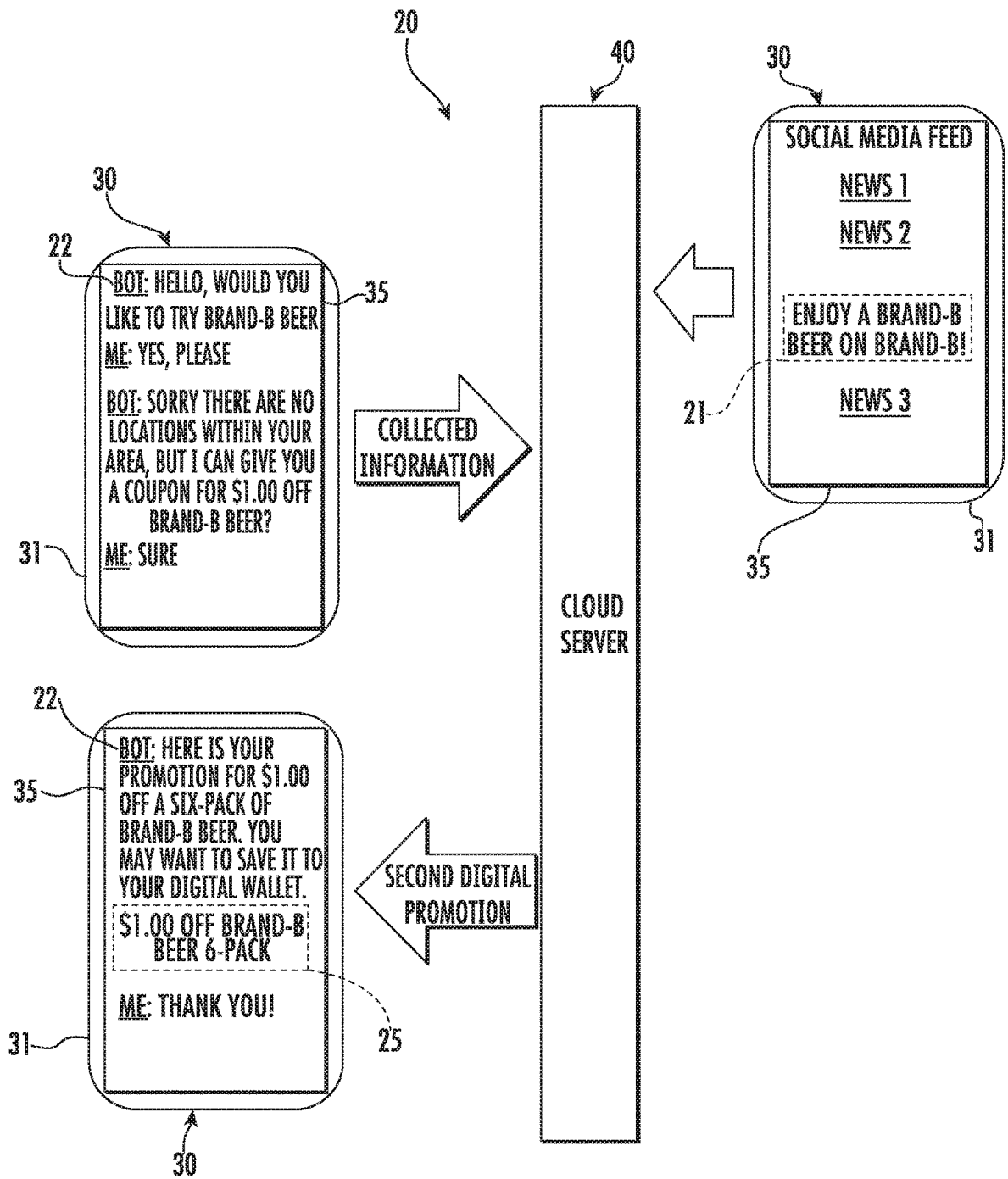
FIG. 1B is a schematic diagram of the system of FIG. 1A operating in a second mode.
Figure 2:
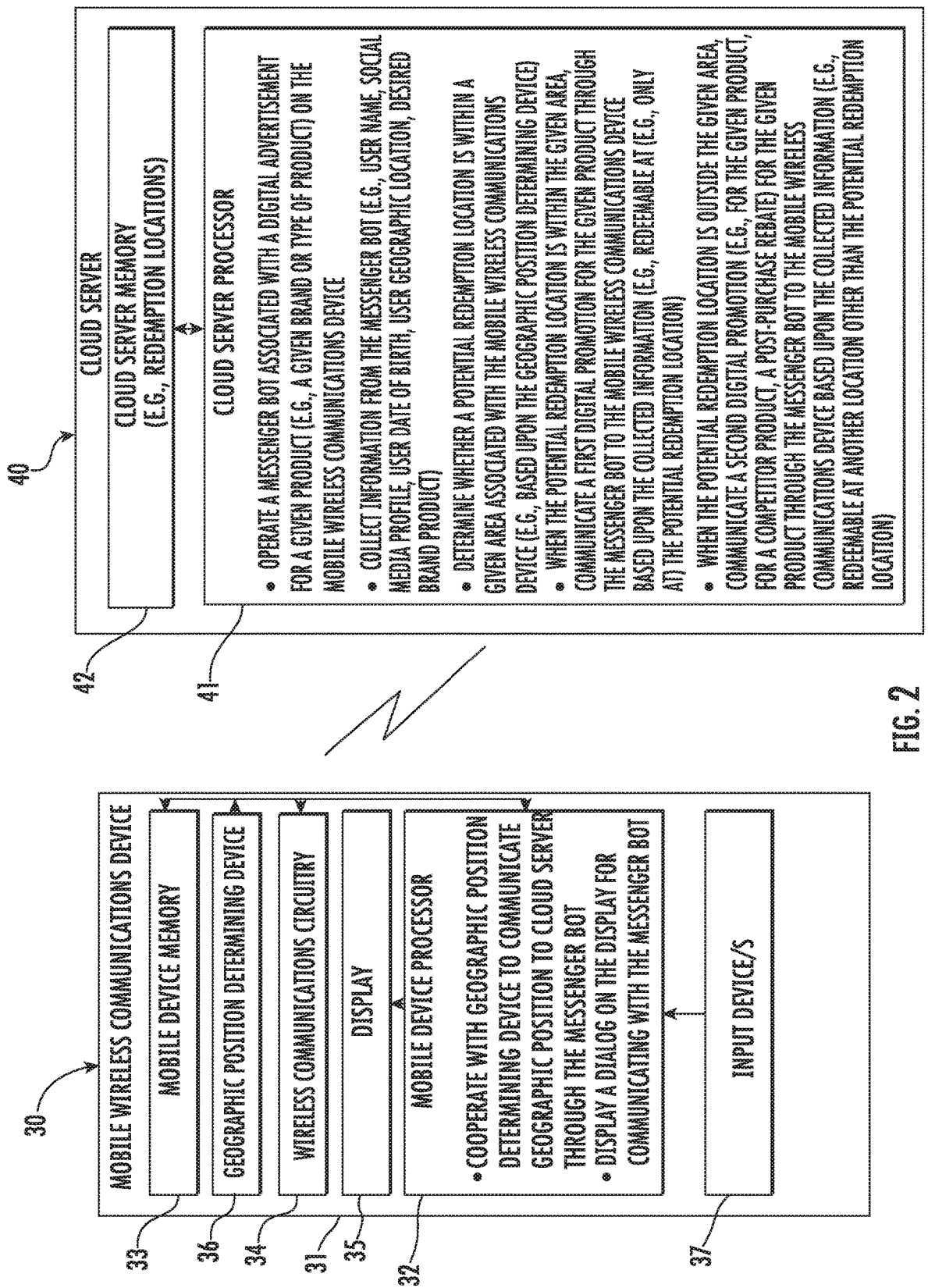
FIG. 2 is a more detailed schematic block diagram of the system of FIGS. 1A and 1B.

Referring initially to FIGS. 1A, 1B, and 2 a system 20 for processing a digital promotion includes a mobile wireless communications device 30 associated with a given user. The mobile wireless communications device 30 illustratively includes a portable housing 31, a mobile device processor 32, a mobile device memory 33 coupled to the mobile device processor, and wireless communications circuitry 34 coupled to the mobile device processor. The mobile wireless communications device 30 also includes a display 35, such as, for example, a touch display, carried by the portable housing 31 and coupled to the mobile device processor 32. The mobile wireless communications device 30 may include one or more input devices 37 and other types of output devices.

The mobile wireless communications device 30 may also include a geographic position determining device 36 cooperating with the mobile device processor 32 to communicate a geographic position of the mobile wireless communications device. The geographic position determining device 36 may be a global positioning system (GPS) device. The mobile wireless communications device 30 may be a mobile phone or smartphone, a tablet computer, or other type of mobile wireless communications device, as will be appreciated by those skilled in the art.

The system 20 also includes a cloud server 40 coupled to the mobile wireless communications device 30. The cloud server 40 includes a cloud processor 41 and a cloud memory 42 coupled to the cloud processor. The cloud server 40 may be a remote computer, for example.

Figure 3:
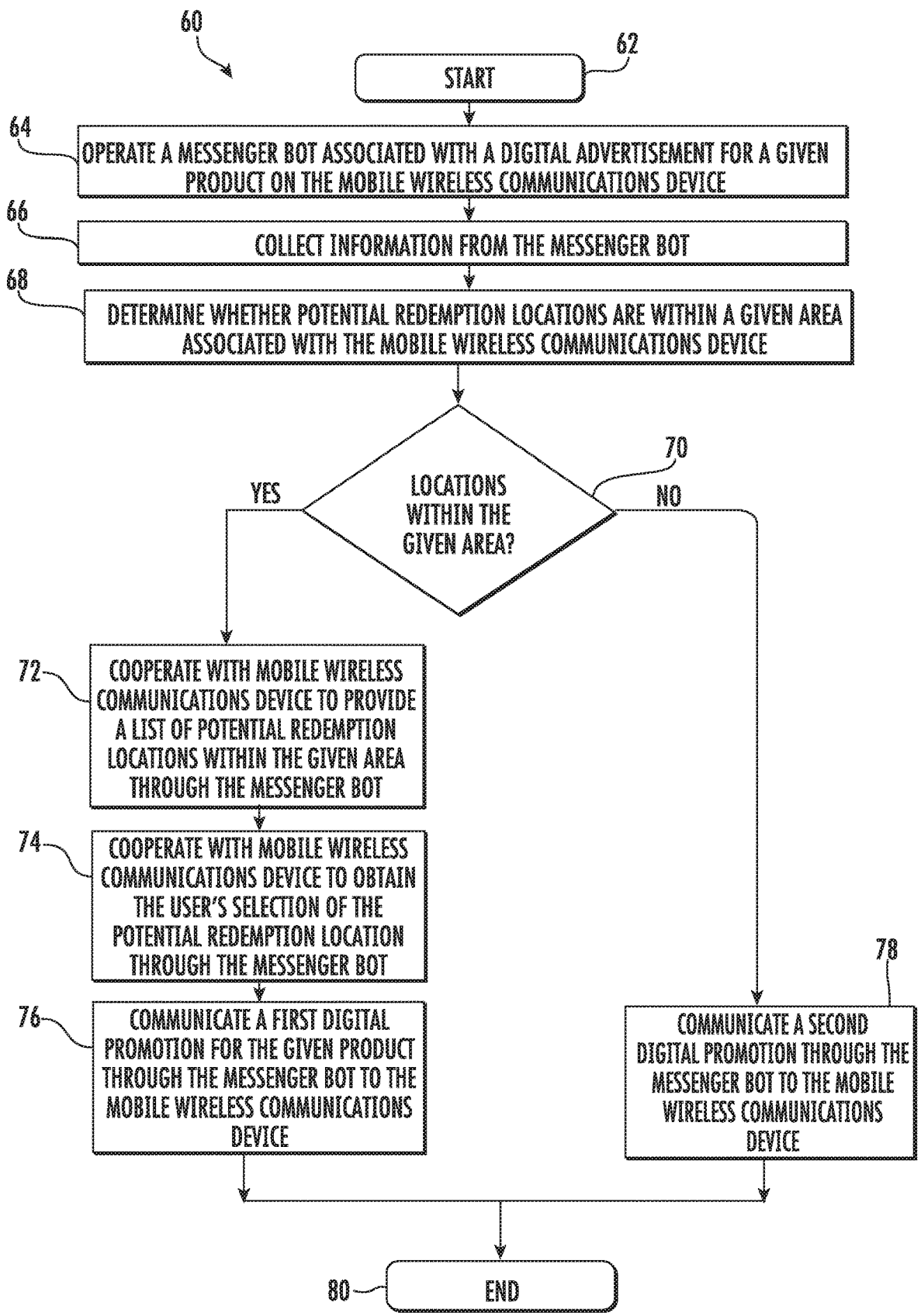
FIG. 3 is a flow diagram illustrating operation of the system of FIG. 2.

Referring now additionally to the flowchart 60 in FIG. 3, details of operation of the system 20 will now be described with reference to the cloud server 40. Beginning at Block 62, the cloud server 40 operates a messenger bot 22 associated with a digital advertisement 21 for a given product on the mobile wireless communications device 30 (Block 64). The given product may be a brand and/or class or type of product, for example, and thus the messenger bot 22 may be associated with a given brand. The digital advertisement 21 may be displayed on the display 35 of the mobile wireless communications device 30, for example, inline in a social media feed. An exemplary digital advertisement 21 may be along the lines of "Enjoy a Brand-B Beer On Brand-B". Of course, the digital advertisement 21 may be included on a website, in an email, and/or other electronic form.

The messenger bot 22 may be implemented in the form of a two-way dialog box that permits the given user to communicate by way of typing (i.e., written communication). In some embodiments, the messenger bot 22 may operate through voice commands or spoken words. The underlying program behind the messenger bot 22 may be a different program, application, and/or website than that serving the digital advertisement 21. For example, the digital advertisement 21 may be inline in a news feed on Facebook while the messenger bot 22 maybe executed through the Facebook Messenger program or application. The application or program associated with the messenger bot 22 may be executed or opened, for example, based upon user selection of the digital advertisement 21.

At Block 66, the cloud server 40 collects information from or through the messenger bot 22. For example, through the messenger bot 22, the cloud server 40 may obtain the given user's name, social media username, email address, social media profile, date of birth, geographic location, and/or desired product from the brand. Of course, the cloud server 40 may collect other and/or additional types of information.

The cloud server 40 also determines whether potential redemption locations are within a given area associated with the mobile wireless communications device 30 (Block 68). A potential redemption location may be a location that is participating in a program that permits redemption of digital promotions provided or communicated through the messenger bot 22, as will be described in further detail below.

The given area may be a threshold driving distance from the given user, for example, 30-minutes or less. The given area associated with the given user may be determined based upon the geographic position determining device 36, triangulation based upon communications with the mobile wireless communications device 30, an identifier associated with the mobile wireless communications device, and/or a network address or addresses used in communication between the mobile wireless communications device and the cloud server 40. The given area may also be determined based upon the collected information from the messenger bot 22. For example, the messenger bot 22 may request the given user provide their address or city and state of their current location. Other techniques and/or information may be used to determine the given area associated with the mobile wireless communications device 30.

When the potential redemption locations are within the given area (Block 70), the cloud server 40 may cooperate with the mobile wireless communications device 30 to provide a list on the display 35 of the potential redemption locations within the given area, e.g., geographic area, through the messenger bot 22 (Block 72). The given user may, based upon input at the mobile wireless communications device 30, select one of the potential redemption locations for potential redemption (FIG. 1A). The given user may select one of the potential redemption locations, for example, the closest location. The cloud server 40 may cooperate with the mobile wireless communications device 30 to obtain the given user's selection thereto through the messenger bot 22 (Block 74).

Also when the selected potential redemption location is within the given area (Block 70) and based upon the user's selection of the potential redemption location (Block 74), the cloud server 40 communicates a first digital promotion 24 for the given product through the messenger bot 22 to the mobile wireless communications device 30 based upon the collected information (Block 76). The first digital promotion 24 may be redeemable for an entire purchase price of the given product. The first digital promotion may be redeemable only at the potential redemption location. In some embodiments, the cloud server 40 and the mobile wireless communications device 30 may cooperate to save the first digital promotion 24 in a digital wallet associated with the user, for example, at either or both the mobile device memory 33 and the cloud memory 42. The first digital promotion 24 may be redeemed, for example, at a point-of-sale (POS) terminal, at the selected redemption location.

Referring to the above Brand-B Beer example, the user may be presented with a list of potential bars and/or restaurants that serve Brand-B Beer and that may participate as a potential redemption location (FIG. 1A). The user may select his or her favorite bar or the bar closest to them through the messenger bot 22 (e.g., Bar-B) and receive the digital coupon 24 for the entire purchase price of a Brand-B Beer that is redeemable at Bar-B only (FIG. 1A). In some embodiments, the digital coupon may also include a gratuity.

If, for example, there is a single potential redemption location, the given user may not be given the opportunity to select the potential redemption location, and the cloud server would thus communicate the first digital promotion for the given product through the messenger bot to the mobile wireless communications device based upon the collected information.

When there are no potential redemption locations within the given area or there are potential redemption locations outside the given area (Block 70), the cloud server 40 communicates a second digital promotion 25 through the messenger bot 22 to the mobile wireless communications device 30 based upon the collected information (Block 78) before ending at Block 80. The second digital promotion 25 may be for the given product (e.g., Brand-B Beer) and may be redeemable at different locations other than the potential redemption locations outside. In some embodiments, the second digital promotion may be for a competitor's product (e.g., Brand-X Beer). The second digital promotion 25 may be in the form of a digital coupon redeemable at a POS terminal during a purchase transaction (e.g., similar to a manufacturers coupon), for example, or a post-purchase electronic rebate, which may be submitted to a third party rebate processor via a respective application or website.

Referring again to the above Brand-B Beer example, if there are no potential redeemable locations for the Brand-B Beer promotion within the given area, that is, there are no locations participating in the program that permits redemption of the Brand-B digital promotions 24 provided or communicated through the messenger bot 22, the user may receive a digital coupon or rebate 25 that may be applied or redeemed at many locations, for example, post purchase (FIG. 1B). The digital coupon or rebate 25 may be for $1.00 off Brand-B Beer and redeemable at a grocery store or anywhere that sells packages of Brand-B Beer, for example (FIG. 1B). The digital coupon or rebate may also be redeemable at another bar.

In some embodiments, the cloud server 40 may provide different first and second digital promotions 24, 25 based upon the collected information, for example, user profile data. In other words, different users may receive, through the messenger bot 22, different first and second digital promotions 24, 25. In some embodiments, where, for example, the collected information includes an email, phone number, or user identification, that collected information may be used to access loyalty program data associated with the given user. Accordingly, purchase history may be obtained by the cloud server 40 (e.g., from a grocery store loyalty program), and used as a basis for the first and second digital promotions 24, 25.

Further and/or additional digital promotions may be communicated through the messenger bot 22. For example, if the given user redeemed the first digital promotion 24 for Brand-B Beer, the given user may receive through the messenger bot 22, as a follow-on after redemption, a digital promotion for Brand-B Beer redeemable at a grocery store or a digital promotion for a bag of chips redeemable at the grocery store. The follow-on digital promotion may be generated based on the collected information, for example, historical purchase data, social media profile data, etc. A follow-on digital promotion may be applied in a similar manner after redemption of the second digital promotion 25.

In contrast to conventional techniques, as will be appreciated by those skilled in the art, the system 20 advantageously provides a directed communication channel, through the messenger bot 22, to deliver targeted digital promotions for potential redemption locations or participating locations that are within the given area. The system 20 also provides targeted digital promotions when there are no potential redemption locations within the given area. Additionally, a manufacturer or brand associated with the given digital advertisement is able to acquire user data, which may be considered more valuable than any digital promotion. For example, through the interaction and engagement between the user the messenger bot 22, the user is able to communicate as if they were communicating with another person. Thus, there may be an increased level of engagement versus passive digital promotion redemption. Moreover, the collected information may be used by the brand or manufacturer and the entity associated with the cloud server for future processing.

It should be understood that while the functions of the cloud server 40 have been described herein, the functions are performed through cooperation between the cloud processor 41 and the cloud memory 42. Additionally, while a given product is described herein, it should be understood that a product may have a service component. That is, in some embodiments, the given product may be one or both of a physical-good and service.

A method aspect is directed to a method of processing a digital promotion. The method includes using a cloud server 40 coupled to a mobile wireless communications device 30 associated with a given user to operate a messenger bot 22 associated with a digital advertisement 21 for a given product on the mobile wireless communications device and collect information from the messenger bot. The method also includes using the cloud server 40 to determine whether a potential redemption location is within a given area associated with the mobile wireless communications device 30, and when the potential redemption location is within the given area, communicate a first digital promotion 24 for the given product through the messenger bot 22 to the mobile wireless communications device 30 based upon the collected information. The method further includes using the cloud server 40 to, when the potential redemption location is outside the given area, communicate a second digital promotion 25 through the messenger bot 22 to the mobile wireless communications device 30 based upon the collected information.

A computer readable medium aspect is directed to a non-transitory computer readable medium for a cloud server 40 of a system 20 for processing a digital promotion. The non-transitory computer readable medium includes computer executable instructions that when executed by a processor 41 of the cloud server 40 cause the processor to perform operations. The operations include operating a messenger bot 22 associated with a digital advertisement 21 for a given product on a mobile wireless communications device 30 associated with a given user and collecting information from the messenger bot. The operations also include determining whether a potential redemption location is within a given area associated with the mobile wireless communications device 30. The operations also include, when the potential redemption location is within the given area, communicating a first digital promotion 24 for the given product through the messenger bot 22 to the mobile wireless communications device 30 based upon the collected information, and when the potential redemption location is outside the given area, communicating a second digital promotion 25 through the messenger bot to the mobile wireless communications device 30 based upon the collected information.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital coupon comprising:
a mobile wireless communications device associated with a given user; and
a cloud server coupled to the mobile wireless communications device and configured to
operate a messenger bot associated with a digital advertisement for a first product on the mobile wireless communications device, the messenger bot being implemented in the form of a two-way dialog between the messenger bot and the given user, and the first product being associated with a given brand,
collect information by the messenger bot, the information collected by the messenger bot comprising social media profile data,
determine whether a potential redemption location is within a threshold distance from the given user based upon the geographic location of the given user, the potential redemption location serving the first product for consumption thereat in an open container,
when the potential redemption location is within the threshold distance from the given user, communicate a first digital coupon for the first product through the messenger bot to the mobile wireless communications device and for display within the two-way dialog, the first digital coupon being redeemable toward on-premise consumption of the first product at the potential redemption location in the open container, and
when the potential redemption location is outside the threshold distance from the given user, communicate a second digital coupon through the messenger bot to the mobile wireless communications device and for display within the two-way dialog, the second digital coupon being redeemable toward a second product of the given brand in a packaged configuration comprising at least one closed container for off-premise consumption.

2. The system of claim 1 wherein the second product is a same product as the first product.

3. The system of claim 1 wherein the second product is a different product than the first product.

4. The system of claim 1 wherein the first digital coupon is redeemable only at the potential redemption location.

5. The system of claim 1 wherein the first digital coupon is for an entire purchase price of the first product and redeemable during a purchase transaction for the first product at the potential location.

6. The system of claim 1 wherein the second digital coupon comprises a post-purchase rebate.

7. The system of claim 1 wherein the cloud server is configured to communicate, through the messenger bot, a plurality of selectable potential redemption locations determined to be within the threshold distance, and collect a user-selected potential redemption location from the plurality of selectable potential redemption locations as the potential redemption location.

8. The system of claim 1 wherein the information collected from the messenger bot comprises at least one of a user name, user date of birth, user geographic location, and desired product from a brand thereof.

9. The system of claim 1 wherein the mobile wireless communications device comprises a geographic position determining device; and wherein the cloud server is configured to determine whether the potential redemption location is within the threshold distance based upon the geographic position determining device.

10. The system of claim 1 wherein the cloud server is configured to cooperate with the mobile wireless communications device to store the first digital coupon in a digital wallet associated with the given user.

11. A cloud server for a system for processing a digital coupon comprising:
a processor and a memory cooperating therewith to
operate a messenger bot associated with a digital advertisement for a first product on a mobile wireless communications device associated with a given user, the messenger bot being implemented in the form of a two-way dialog between the messenger bot and the given user, and the first product being associated with a given brand,
collect information by the messenger bot, the information collected by the messenger bot comprising social media profile data,
determine a geographic location of the given user based upon the social media profile data,
determine whether a potential redemption location is within a threshold distance from the given user based upon the geographic location of the given user, the potential redemption location serving the first product for consumption thereat in an open container,
when the potential redemption location is within the threshold distance from the given user, communicate a first digital coupon for the first product through the messenger bot to the mobile wireless communications device and for display within the two-way dialog, the first digital coupon being redeemable toward on-premise consumption of the first product at the potential redemption location in the open container, and
when the potential redemption location is outside the threshold distance from the given user, communicate a second digital coupon through the messenger bot to the mobile wireless communications device and for display within the two-way dialog, the second digital coupon being redeemable toward a second product of the given brand in a packaged configuration comprising at least one closed container for off-premise consumption.

12. The cloud server of claim 11 wherein the second product is a same product as the first product.

13. The cloud server of claim 11 wherein the first digital coupon is only redeemable at the potential redemption location.

14. The cloud server of claim 11 wherein the first digital coupon is for an entire purchase price of the first product and redeemable during a purchase transaction for the first product at the potential location.

15. The cloud server of claim 11 wherein the second digital coupon comprises a post-purchase rebate.

16. The cloud server of claim 11 wherein the processor is configured to communicate, through the messenger bot, a plurality of selectable potential redemption locations determined to be within the threshold distance, and collect a user-selected potential redemption location from the plurality of selectable potential redemption locations as the potential redemption location.

17. A method of processing a digital coupon comprising:
using a cloud server coupled to a mobile wireless communications device associated with a given user to
operate a messenger bot associated with a digital advertisement for a first product on the mobile wireless communications device, the messenger bot being implemented in the form of a two-way dialog between the messenger bot and the given user, and the first product being associated with a given brand,
collect information by the messenger bot, the information collected by the messenger bot comprising social media profile data,
determine a geographic location of the given user based upon the social media profile data,
determine whether a potential redemption location is within a threshold distance from the given user based upon the geographic location of the given user, the potential redemption location serving the first product for consumption thereat in an open container,
when the potential redemption location is within the threshold distance from the given user, communicate a first digital coupon for the first product through the messenger bot to the mobile wireless communications device and for display within the two-way dialog, the first digital coupon being redeemable toward on-premise consumption of the first product at the potential redemption location in the open container, and
when the potential redemption location is outside the threshold distance from the given user, communicate a second digital coupon through the messenger bot to the mobile wireless communications device and for display within the two-way dialog, the second digital coupon being redeemable toward a second product of the given brand in a packaged configuration comprising at least one closed container for off-premise consumption.

18. The method of claim 17 wherein the second product is a same product as the first product.

19. The method of claim 17 wherein the first digital coupon is only redeemable at the potential redemption location.

20. The method of claim 17 wherein the first digital coupon is for an entire purchase price of the first product and redeemable during a purchase transaction for the first product at the potential location.

21. The method of claim 17 wherein the second digital coupon comprises a post-purchase rebate.

22. The method of claim 17 wherein the cloud server is used to communicate, through the messenger bot, a plurality of selectable potential redemption locations determined to be within the threshold distance, and collect a user-selected potential redemption location from the plurality of selectable potential redemption locations as the potential redemption location.

23. A non-transitory computer readable medium for a cloud server of a system for processing a digital coupon, the non-transitory computer readable medium comprising computer executable instructions that when executed by a processor of the cloud server cause the processor to perform operations comprising:
operating a messenger bot associated with a digital advertisement for a first product on a mobile wireless communications device associated with a given user, the messenger bot being implemented in the form of a two-way dialog between the messenger bot and the given user, and the first product being associated with a given brand;
collecting information by the messenger bot, the information collected by the messenger bot comprising social media profile data;
determining a geographic location of the given user based upon the social media profile data;
determining whether a potential redemption location is within a threshold distance from the given user based upon the geographic location of the given user, the potential redemption location serving the first product for consumption thereat in an open container;
when the potential redemption location is within the threshold distance from the given user, communicating a first digital coupon for the first product through the messenger bot to the mobile wireless communications device and for display within the two-way dialog, the first digital coupon being redeemable toward on-premise consumption of the first product at the potential redemption location in the open container; and
when the potential redemption location is outside the threshold distance from the given user, communicating a second digital coupon through the messenger bot to the mobile wireless communications device and for display within the two-way dialog, the second digital coupon being redeemable toward a second product of the given brand in a packaged configuration comprising at least one closed container for off-premise consumption.

24. The non-transitory computer readable medium of claim 23 wherein the second product is a same product as the first product.

25. The non-transitory computer readable medium of claim 23 wherein the operations comprise communicating, through the messenger bot, a plurality of selectable potential redemption locations determined to be within the threshold distance, and collecting a user-selected potential redemption location from the plurality of selectable potential redemption locations as the potential redemption location.

26. The cloud server of claim 11 wherein the second product is a different product than the first product.

27. The method of claim 17 wherein the second product is a different product than the first product.

28. The non-transitory computer readable medium of claim 23 wherein the second product is a different product than the first product.

* * * * *

UNITED STATES PATENT AND TRADEMARK OFFICE
CERTIFICATE OF CORRECTION

| | |
|---|---|
| PATENT NO. | : 11,282,110 B1 |
| APPLICATION NO. | : 16/017576 |
| DATED | : March 22, 2022 |
| INVENTOR(S) | : Walker et al. |

It is certified that error appears in the above-identified patent and that said Letters Patent is hereby corrected as shown below:

In the Claims

Column 7, Line 45     Insert: --determine a geographic location of the given user based upon the social media profile data-- after Column 7, Line 44, "social media profile data,"

Signed and Sealed this
Twenty-third Day of August, 2022

Katherine Kelly Vidal
*Director of the United States Patent and Trademark Office*